(12) United States Patent
Sherwood

(10) Patent No.: US 8,746,993 B2
(45) Date of Patent: Jun. 10, 2014

(54) SYSTEM FOR STORING A CAMERA FOR QUICK USE

(76) Inventor: Brent Wayne Sherwood, Amarillo, TX (US)

( * ) Notice: Subject to any disclaimer, the term of this patent is extended or adjusted under 35 U.S.C. 154(b) by 0 days.

(21) Appl. No.: 13/026,263

(22) Filed: Feb. 13, 2011

(65) Prior Publication Data

US 2012/0207463 A1 Aug. 16, 2012

(51) Int. Cl.
*F16M 11/10* (2006.01)
*F16M 11/04* (2006.01)
*F16M 11/12* (2006.01)
*F16M 11/18* (2006.01)
*G03B 17/56* (2006.01)

(52) U.S. Cl.
CPC .............. *F16M 11/04* (2013.01); *F16M 11/12* (2013.01); *F16M 11/10* (2013.01); *F16M 11/18* (2013.01); *G03B 17/56* (2013.01)
USPC ........... 396/428; 348/373; 348/375; 396/419; 396/420; 396/421; 396/422; 396/423

(58) Field of Classification Search
CPC ....................................................... F16M 11/04
USPC .......... 206/316.2; 248/187.1; 348/231.7, 281, 348/302, 333.07, 373, 375; 396/419–428
See application file for complete search history.

(56) References Cited

U.S. PATENT DOCUMENTS

| | | | |
|---|---|---|---|
| 2,483,711 A | 10/1946 | Roos | |
| 2,413,272 A * | 12/1946 | Wheelwright | 396/428 |
| 3,291,179 A * | 12/1966 | Lang | 206/316.2 |
| 3,966,101 A * | 6/1976 | Taylor, III | 224/219 |
| 4,341,452 A * | 7/1982 | Korling | 396/428 |
| 4,733,259 A * | 3/1988 | Ng | 396/419 |
| 5,612,515 A * | 3/1997 | Eisen | 177/126 |
| 6,330,961 B1* | 12/2001 | Borja | 224/222 |
| 6,899,255 B2* | 5/2005 | Pringle | 224/221 |
| 6,955,484 B2* | 10/2005 | Woodman | 396/423 |
| 7,273,321 B2* | 9/2007 | Woodman | 396/420 |
| 7,422,379 B2* | 9/2008 | Agevik et al. | 396/424 |
| 7,458,736 B2* | 12/2008 | Woodman | 396/420 |
| 7,549,807 B2* | 6/2009 | Nazarian | 396/420 |
| 7,780,126 B2* | 8/2010 | Law et al. | 248/168 |
| 7,958,602 B2* | 6/2011 | Nishizawa et al. | 16/367 |
| 8,002,480 B2* | 8/2011 | Polster | 396/425 |
| 8,016,492 B2* | 9/2011 | Pyle | 396/423 |
| 2003/0044180 A1* | 3/2003 | Lindberg | 396/420 |
| 2003/0094385 A1* | 5/2003 | Moldovan | 206/38 |
| 2005/0270732 A1* | 12/2005 | Titzler et al. | 361/681 |
| 2006/0008269 A1* | 1/2006 | Woodman | 396/423 |
| 2008/0240705 A1* | 10/2008 | Nazarian | 396/420 |
| 2009/0280861 A1* | 11/2009 | Khan | 455/556.1 |
| 2010/0006518 A1* | 1/2010 | Brobst | 211/26 |
| 2010/0316369 A1* | 12/2010 | Pyle | 396/423 |
| 2011/0069947 A1* | 3/2011 | Orf | 396/419 |

\* cited by examiner

*Primary Examiner* — Clayton E Laballe
*Assistant Examiner* — Kevin Butler
(74) *Attorney, Agent, or Firm* — Shannon L Warren

(57) ABSTRACT

A system for mounting a camera to an arm is disclosed. Specifically, the system can comprise a bracket system capable of supporting a camera; and an arm mount, wherein the bracket system connects to the arm mount. The system can also comprise a hinge system that mounts bracket system to arm mount. The hinge system can comprise a first portion and a second portion. The first portion can connect to the bracket system, and the second portion can connect to the arm mount.

17 Claims, 7 Drawing Sheets

US 8,746,993 B2

SYSTEM FOR STORING A CAMERA FOR QUICK USE

BACKGROUND

This disclosure relates to a system for a camera arm mount system.

Today, cameras are smaller, cheaper and produce better quality pictures than ever before. As a consequence more and more people carry cameras to capture moments while on vacation and in their daily lives. In some situations, such as during an important event or at a particular location, a user may wish to take many photos. However, the user may also need the use of his or her hands, forcing the user to store and remove the camera between uses. To alleviate this problem, a few solutions have been offered. One current solution includes attaching a rope loop to the camera, capable of sliding over a wrist. Another solution is to place a neckband on the camera to allow the camera to hang around the user's neck. Still another solution includes mounting a case to a belt buckle.

However, each solution mentioned above has problems associated with it. The rope loop often is too loose, and even when fitted snugly, still allows the camera to hang down, exposing it to damage, or requiring the user to hold the camera. The neckband also allows the camera to hang freely, exposing the camera to greater risk of damage, particularly if the user is in an active environment. A belt loop mounted case protects the camera, but can be bulky and requires extra time to take out the camera.

It would therefore be advantageous to implement a camera arm mount system.

SUMMARY

A system for mounting a camera to an arm is disclosed. Specifically, the system can comprise a bracket system capable of supporting a camera; and an arm mount, wherein the bracket system connects to the arm mount. The system can also comprise a hinge system that mounts bracket system to arm mount. The hinge system can comprise a first portion and a second portion. The first portion can connect to the bracket system, and the second portion can connect to the arm mount.

DETAILED DESCRIPTION

Described herein is a camera arm mount system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any project), numerous design decisions must be made to achieve the designer' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the applicable art. Accordingly, the claims appended hereto are not intended to be limited by the disclosed embodiments, but are to be accorded their widest scope consistent with the principles and features disclosed herein.

Figure 1:
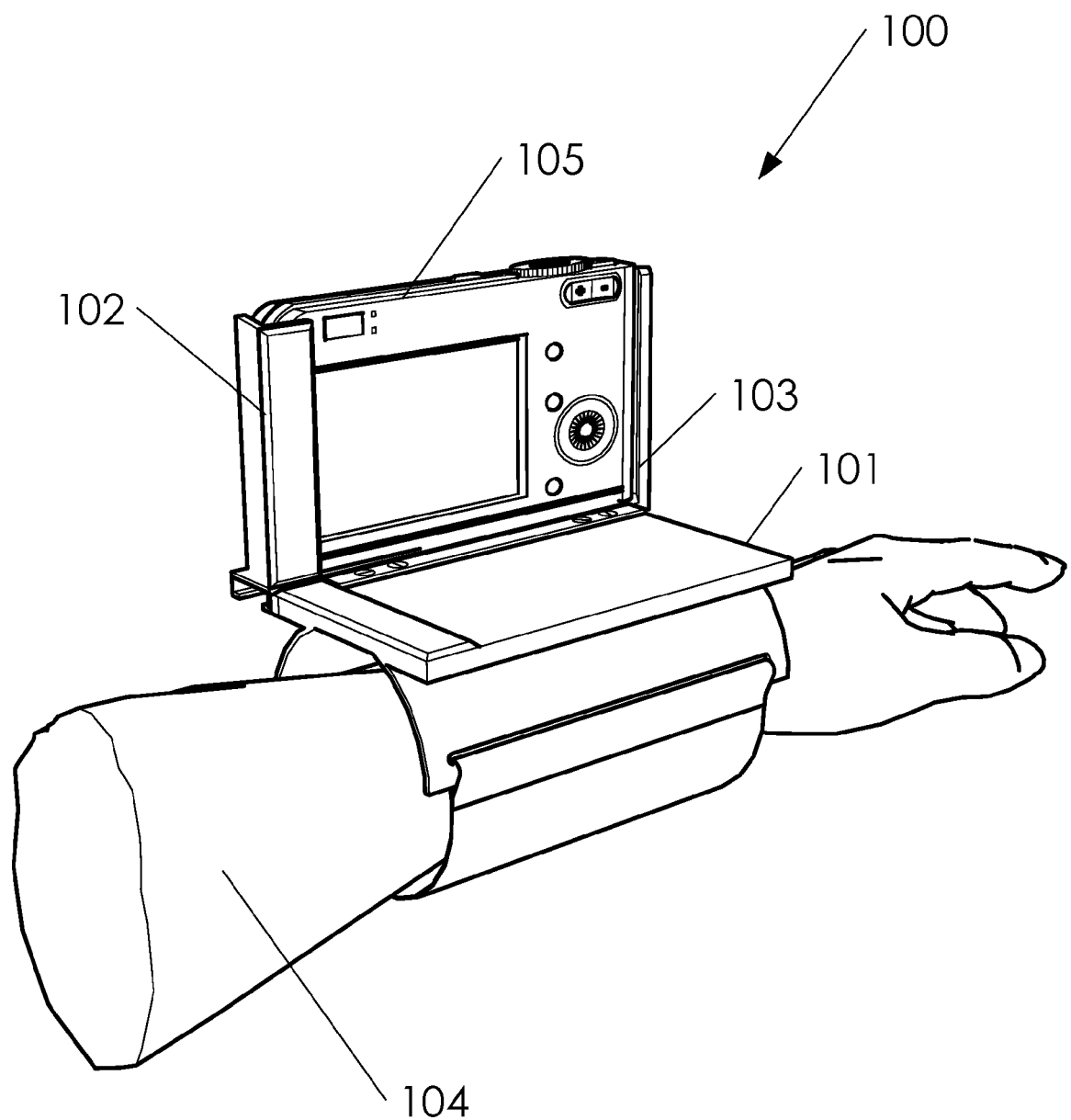
FIG. 1 illustrates a camera arm mount system.

FIG. 1 illustrates a camera arm mount system 100. Camera arm mount system 100 can comprise an arm mount 101, a bracket system 102, and a hinge system 103. In one embodiment, arm mount 101 can attach to an arm 104. Bracket system 102 can support a camera 105. Further, in one embodiment, hinge system 103 can connect bracket system 102 to arm mount 101.

Figure 2:
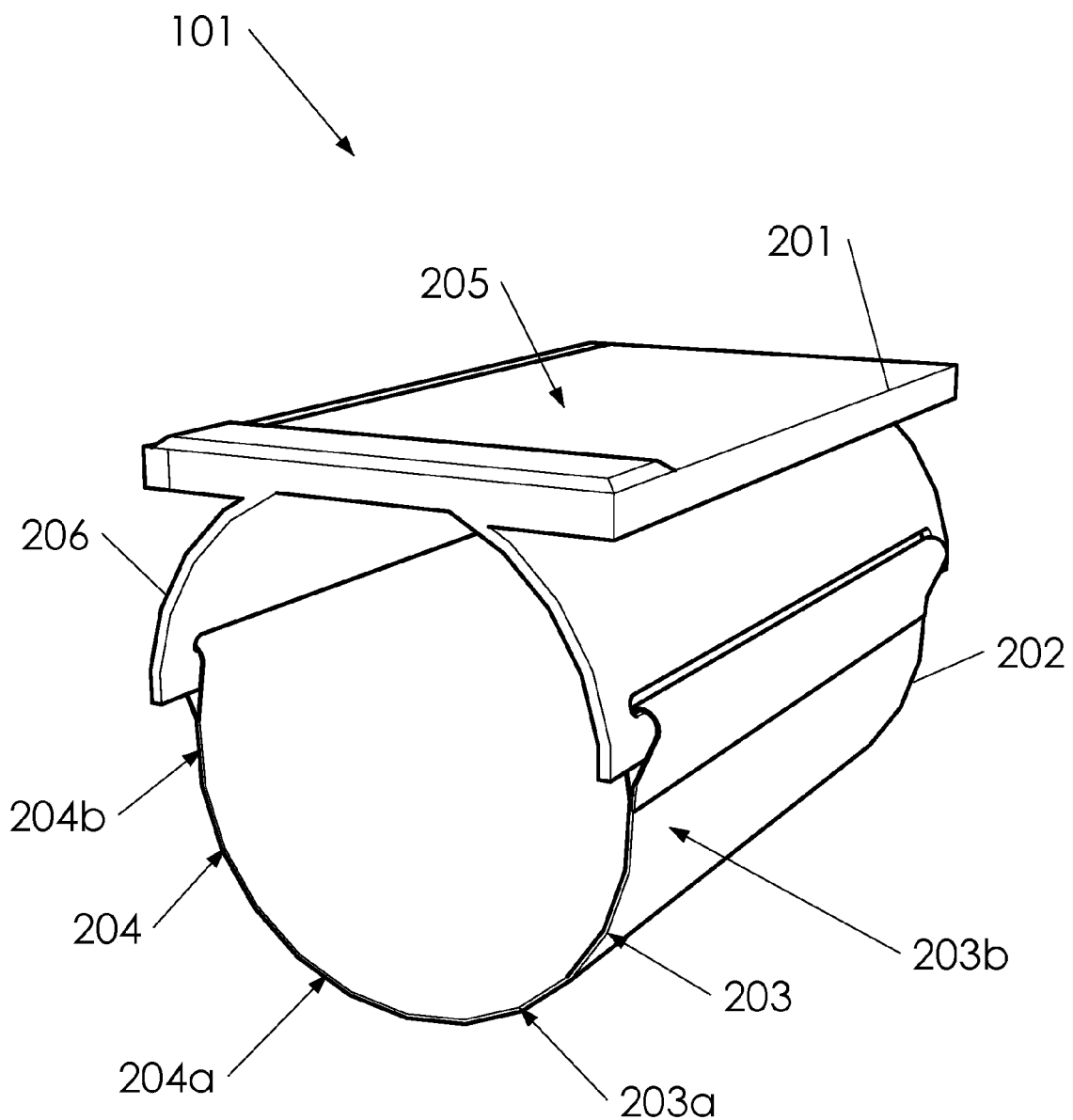
FIG. 2 illustrates arm mount.

FIG. 2 illustrates arm mount 101. Arm mount 101 can comprise a non-use support 201 for camera 105, and an armband 202. In one embodiment, non-use support 201 and armband 202 are formed from substantially the same piece of material. In another embodiment, non-use support 201 and armband 202 can be two or more different pieces of material. In such embodiment, armband 202 can affix arm mount 101 to arm 104 in a number of ways. In one embodiment, armband 202 can comprise a first side 203 and a second side 204. First side 203 can comprise a bottom portion 203*a* and a top portion 203*b*. Second side 204 can comprise can comprise a bottom portion 204*a* and a top portion 204*b*. Bottom portion 203*a* can comprise a set of one or more fasteners capable of mating with a set of one or more fasteners on a bottom side 204*a*. Examples of mateable fasteners include, but are not limited to, watchstraps and buckles, buttons, and clasps. In one embodiment, the first and second side of armband 202 can be a single article capable of stretching over and around arm 105, as shown in FIG. 2. In one embodiment, armband 202 can comprise an elastic material. In another embodiment, an armband first side top portion 203*b* and an armband second side top portion 204*b* can connect to non-use support 201. In such embodiment, top portions 203*b* and 204*b* can connect to opposite sides of non-use support 201. In another configuration, the top portions 203*b* and 204*b* can be connected to form a single top portion.

Non-use support 201 can comprise a surface 205. In one embodiment, surface 205 can be a curved surface, in the general shape of the curvature of arm 104. In another embodiment, surface 201 can be substantially flat. In such embodiment, non-use support 201 can further comprise a subsurface 206, existing below and attached to surface 205. In one embodiment, top portions 203*b* and 204*b* can connect to surface 205. In another embodiment, top portions 203*b* and 204*b* can connect to subsurface 206, as shown in FIG. 2.

Figure 3:
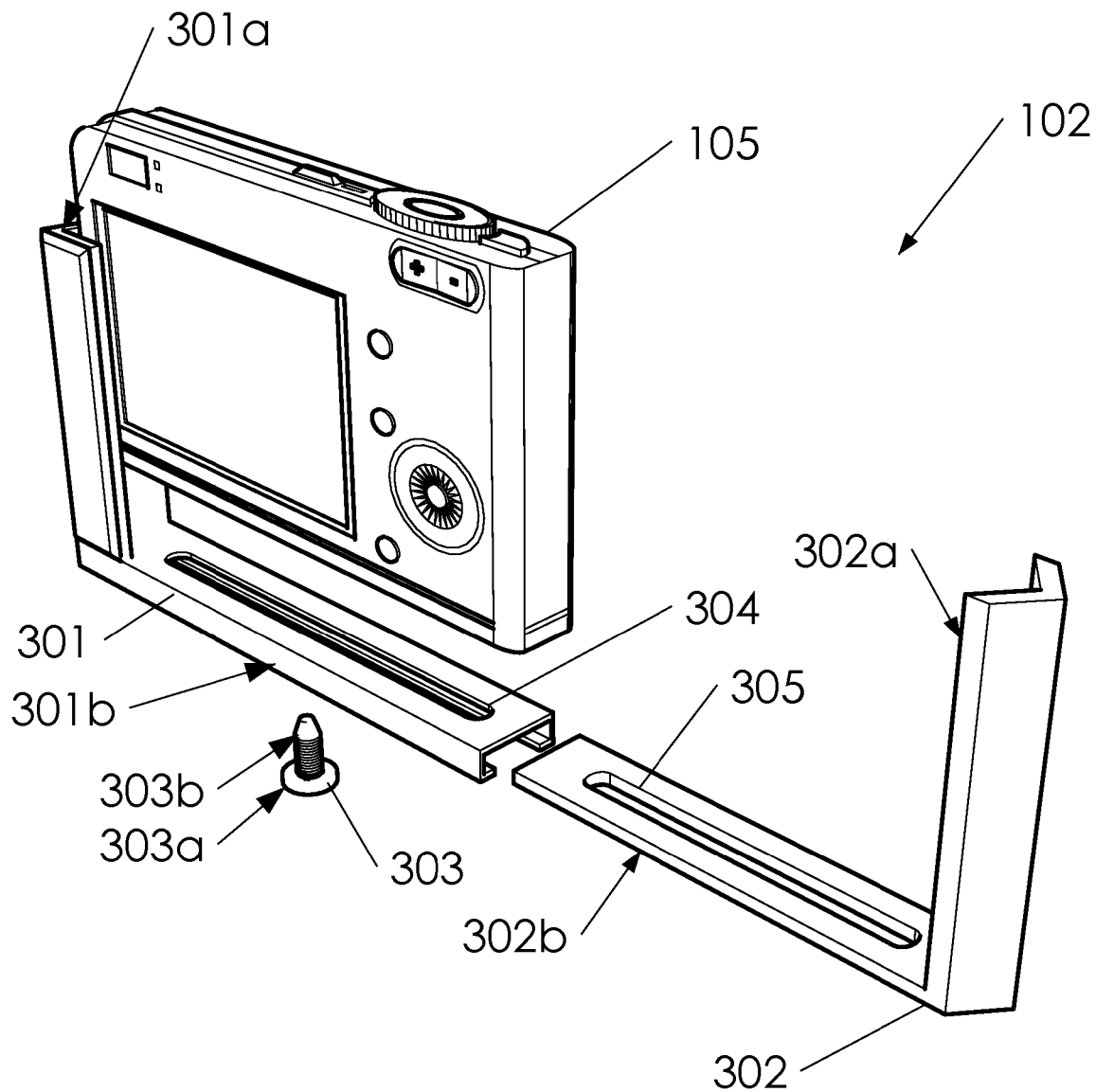
FIG. 3 illustrates bracket system.

FIG. 3 illustrates bracket system 102. The bracket system 102 can support camera 105. Bracket system 102 can comprise a first bracket 301, a second bracket 302, and/or a camera fastener 303. Camera fastener 303 can comprise a camera fastener head 303*a* and a camera fastener body 303*b*. First bracket 301 can be substantially in the shape of an "L", having a side portion 301*a* and a bottom portion 301*b*. In one embodiment, side portion 301*a* can comprise two connected substantially planar walls, one wall substantially parallel with the back of camera 105, and a second wall substantially parallel with a side of camera 105, as is shown in FIG. 3. In another embodiment, side portion 301*a* can be curved or substantially in the shape of a "V". In yet another embodiment, side portion 301a can be planar and substantially parallel with a side of camera 105.

In one embodiment, bottom portion 301b can be flat. In another embodiment, edges can be bent downward so as to form an upside down "U" shape. Still further, in another embodiment, bottom portion 301b edges can each be bent downward and inward, as shown in FIG. 3, to form a track for second bracket 302. Bottom portion 301b can comprise an aperture 304. In one embodiment, aperture 304 can extend along bottom portion 301b, aperture 304 having a length much longer than its width, as shown in FIG. 3.

Second bracket 302 can also be substantially in the shape of an "L", having a side portion 302a and a bottom portion 302b. In one embodiment, side portion 302a can be planar and substantially parallel with a second side of camera 105. In another embodiment, side portion 302a can be curved or substantially in the shape of a "V". Bottom portion 302b can comprise an aperture 305. In one embodiment, aperture 304 can extend along the bottom portion 301b, aperture 305 having a length much longer than its width, as shown in FIG. 3. Second bracket 302 can align with first bracket such that at least a portion of aperture 304 and aperture 305 overlap. In one embodiment, apertures 304 and 305 can each be a plurality of individual orifices, each large enough for only a portion of camera fastener 303 to pass through. In another embodiment, apertures 304 and 305 can each vary in width intermittently to form interval positions at which only a camera fastener 303 can pass. In one embodiment, bottom portion 302b can slide inside a track formed by bended edges of bottom portion 301a. In another embodiment, camera 105 can be held in bracket system 102 by a combination of camera fastener 303, side portion 301a, and side portion 302a. In one embodiment, where side portions 301a and 302a are substantially in the shape of a "V", camera 105 is prohibited from rotating about the central axis of camera fastener 303 by the shapes of side portions 301a and 302a.

Figure 4:
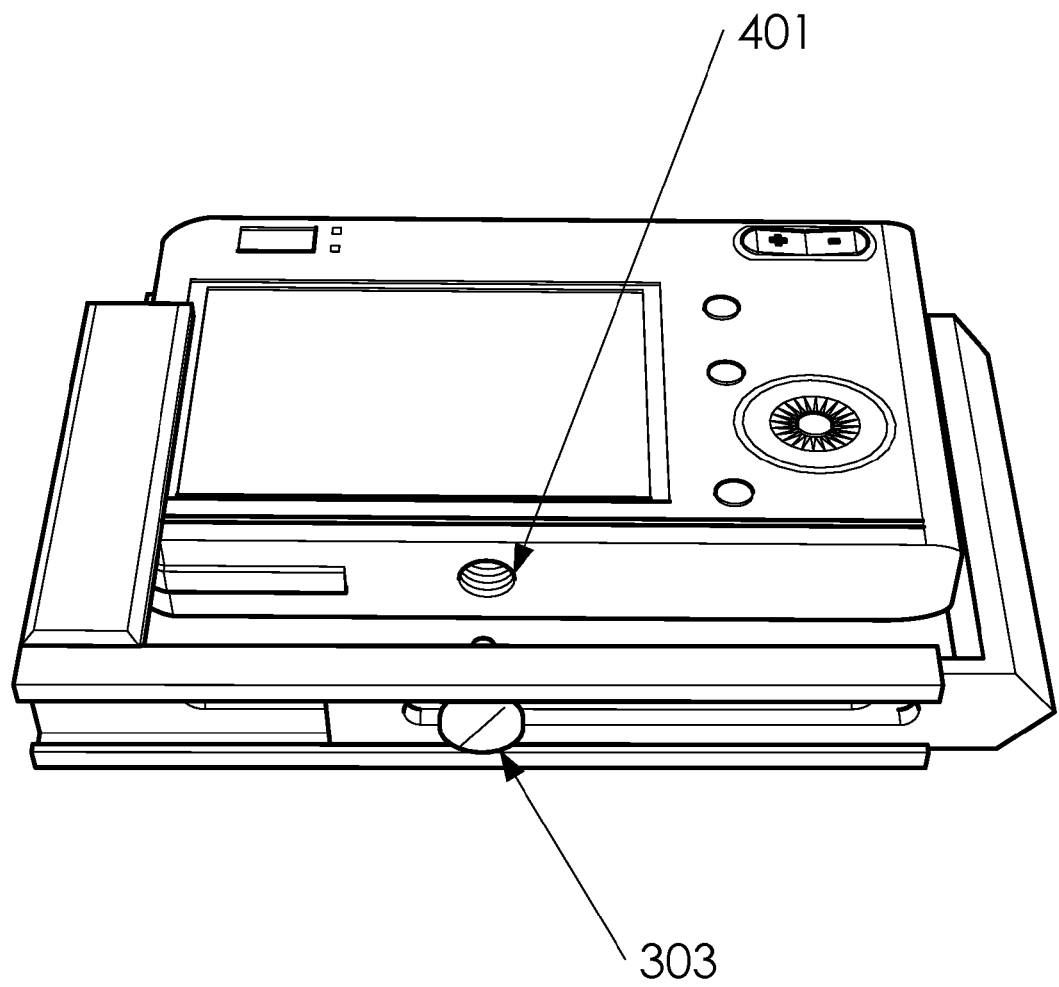
FIG. 4 illustrates camera fastener interacting with second frame bracket and first bracket, wherein second frame bracket is in a closed position.

FIG. 4 illustrates camera fastener 303 interacting with second frame bracket 302 and first bracket 301, wherein second frame bracket 302 is in a closed position. Camera 105 can comprise a camera fastener receiver 401. In one embodiment, camera fastener body 303b and camera fastener receiver 401 can be threaded, which is common to most cameras. As camera fastener body 303b is placed into camera receiver 401 through aperture 304 and aperture 305, either by screwing or some other secure fashion known in the art, first bracket 301 and second bracket 302 can be pressed against each other. In one embodiment, the pressure created from securing the camera fastener 303 in camera fastener bracket 401 compresses first bracket 301 against second frame bracket 302 such that second frame bracket 302 can no longer move freely. In one embodiment, a washer can be placed between the camera fastener head 303a and bracket system 102. Further, in one embodiment, at least a portion of each surface of frame bracket 301 and frame bracket 302 can have a high coefficient of friction where first bracket 301 and second frame bracket 302 touch, thereby creating grip. A high coefficient of friction can be achieved using a rough surface as opposed to a smooth surface, or a material such as rubber. In another embodiment, a washer can be placed between the camera fastener head 303a and frame brackets. In such embodiment, such washer can be made of an elastic or deformable material, such as rubber.

Figure 5A:
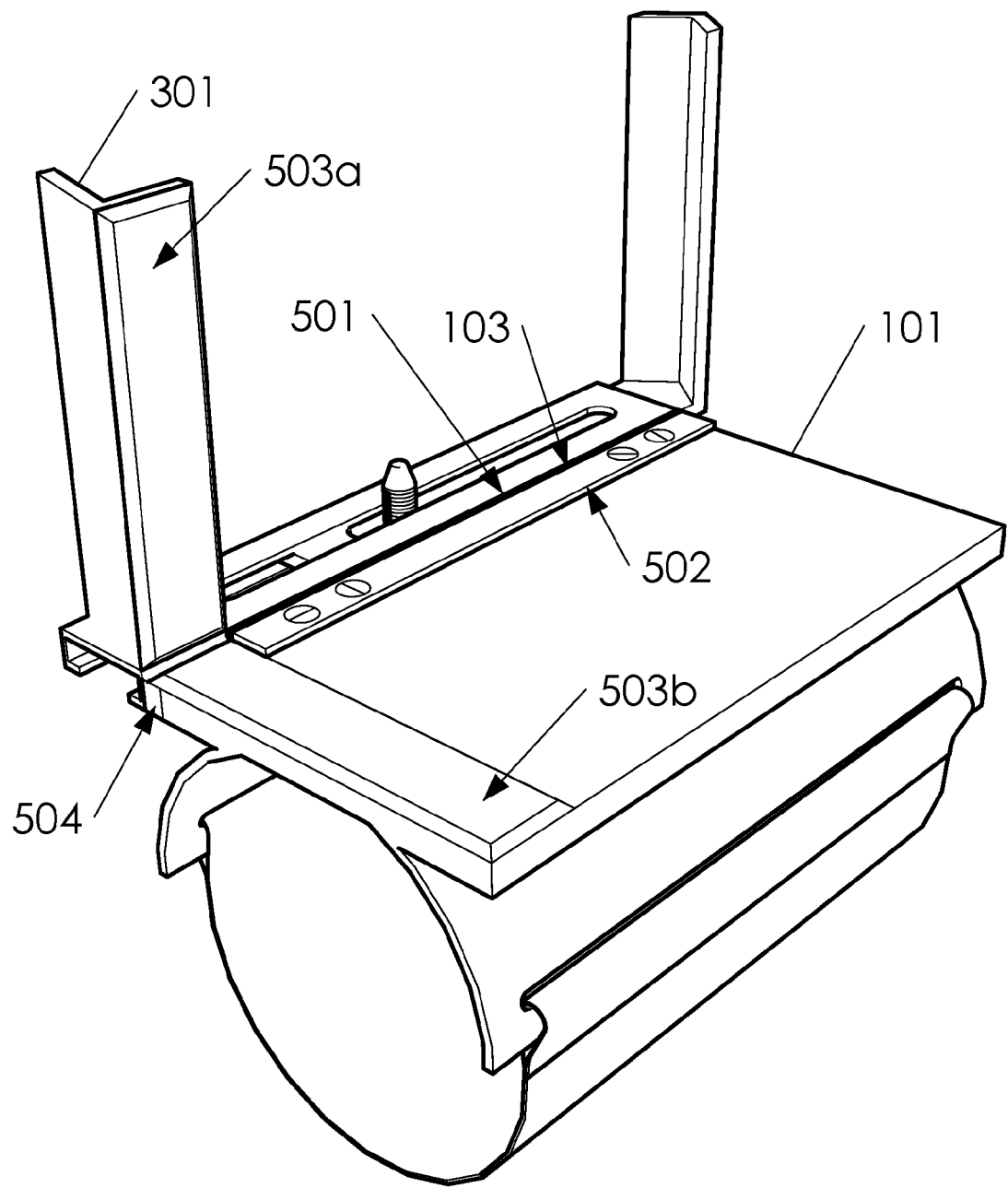
FIG. 5A illustrates hinge system in an open position.

FIG. 5A illustrates hinge system 103 in an open position. Hinge system 103 comprises a first portion 501 and a second portion 502. In one embodiment, hinge system first portion 501 can be structurally built into frame bracket system 103, as shown in FIG. 5A. In another embodiment, first portion 501 can be a separate component from hinge system 103. In one embodiment, hinge system second portion 502 can be structurally built into arm mount 101. In another embodiment, second portion 502 can be a separate component from arm mount 101, as shown in FIG. 5A.

The camera arm mount system 100 can comprise a non-use position clasping device 503. Non-use position clasping device 503 can comprise a first portion 503a and a second portion 503b. In one embodiment, the non-use position clasping device 503 can be one or more magnets. For example, first bracket 301 can be made of a ferromagnetic material. In such embodiment, non-use position clasping device 503 can comprise of one or more magnets attached to arm mount 101. In another embodiment, at least a portion of arm mount 101 can be made of a ferromagnetic material. In such embodiment, non-use clasping device 503 can comprise of one or more magnets attached to first bracket 301. In another embodiment, non-use position clasping device 503 can comprise of two sets of magnets, one set attached to first bracket 301 and the other set attached to arm mount 101. In another embodiment, clasp device 503 can be a pair of hook-and-loop fasteners (such as Velcro® strips) where first portion 503a is attached on first bracket 301 and second portion 503b is attached to arm mount 101, as shown in FIG. 5A. In another embodiment, arm mount 101 can comprise a latch that "catches" or receives frame bracket 101. A person having ordinary skill in the art will recognize that there are many suitable types of non-use position clasping device 503.

Figure 5B:
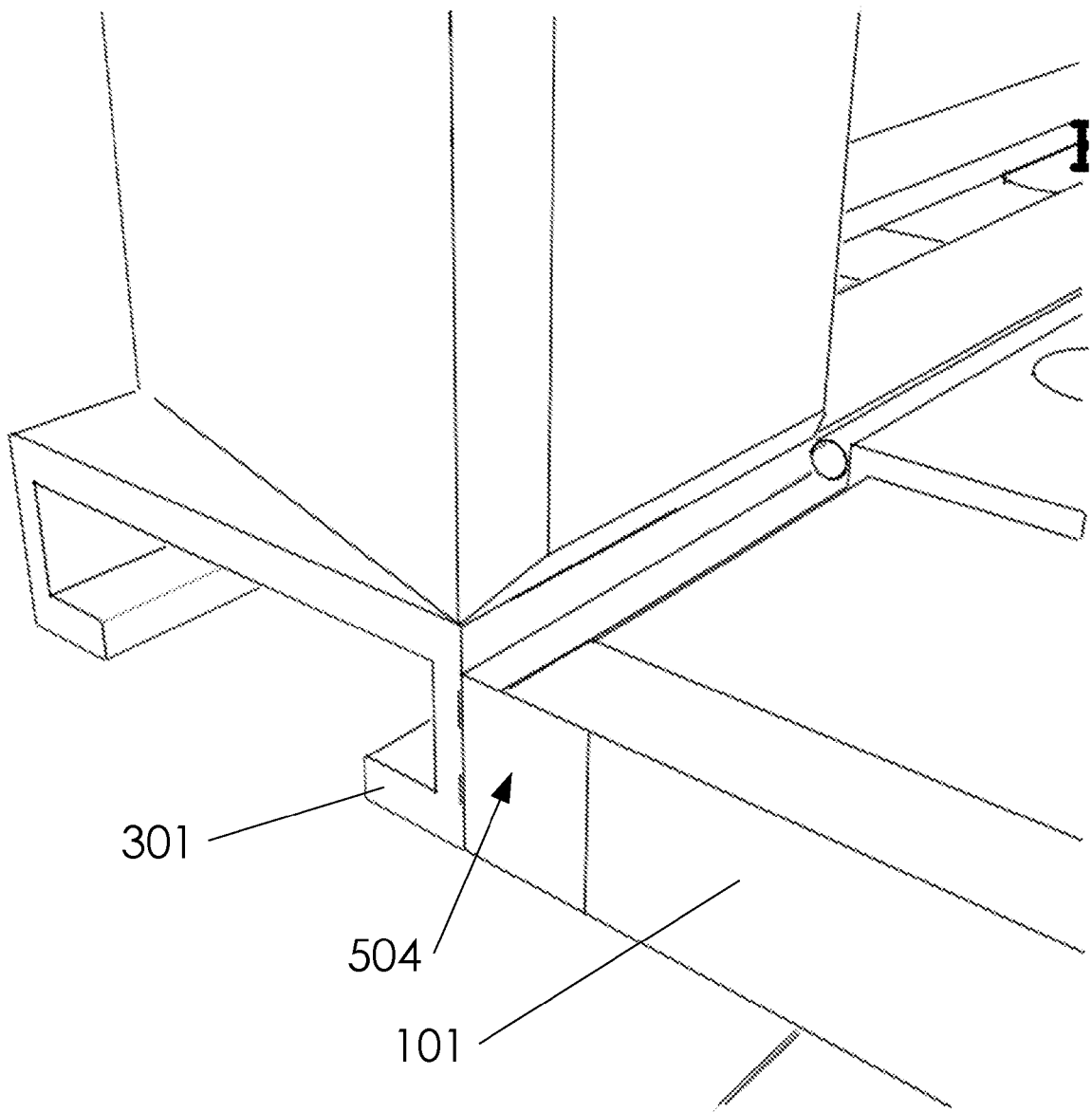
FIG. 5B illustrates a detailed view of open position clasping device.

FIG. 5B illustrates a detailed view of an open position clasping device 504. To hold hinge system in an open position, a number of clasping devices can be used. In one embodiment open position clasping device 504 can be one or more magnets. For example, first bracket 301 can be made of a ferromagnetic material. In such an embodiment, open clasping device 504 can comprise of one or more magnets attached to arm mount 101, as shown in FIG. 5B. In another embodiment, at least a portion of arm mount 101 can be made of a ferromagnetic material. In such an embodiment, open clasping device 504 can comprise of one or more magnets attached to first bracket 301. In another embodiment, open clasping device 504 can comprise of two sets of magnets, one set attached to first bracket 301 and the other set attached to arm mount 101. In another embodiment, clasp device 504 can be a pair of hook-and-loop fasteners (such as Velcro® strips), one strip attached on first bracket 301, and the other strip attached to arm mount 101. In another embodiment, arm mount 101 can comprise a latch that "catches" or receives frame bracket 101. A person having ordinary skill in the art will recognize that there are many suitable types of clasping devices 504.

Figure 6:
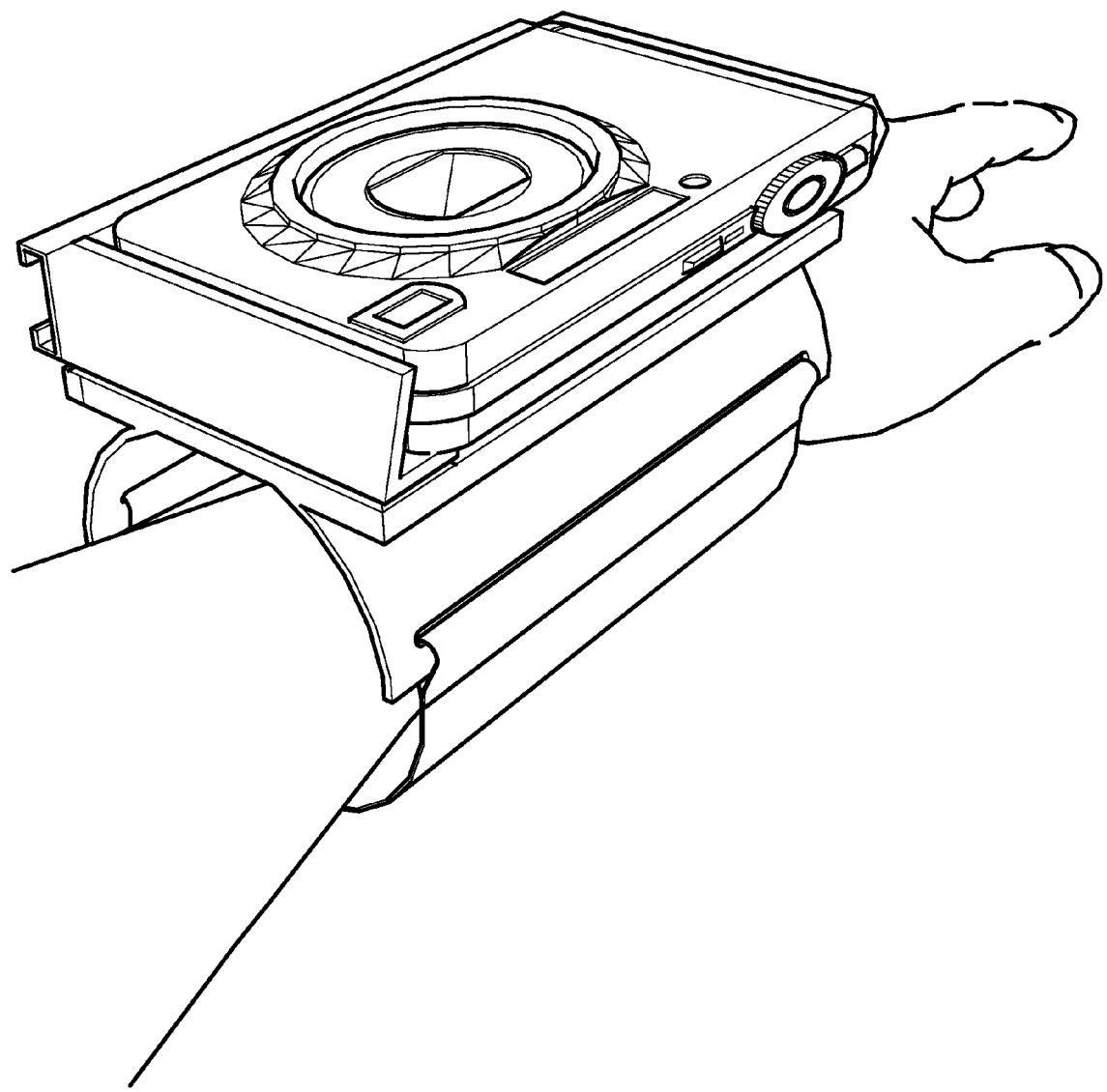
FIG. 6 illustrates a hinge system in a non-use position.

FIG. 6 illustrates a hinge system in a non-use position. Placing camera 105 in a non-use position can help prevent damage to camera when it is not being used.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. A system for mounting a camera to an arm comprising:
a bracket system capable of supporting a camera;
an arm mount;
a hinge system, having a first portion and a second portion, wherein said hinge system connects said bracket system to said arm mount;
said bracket system comprises a first bracket and a second bracket;
said first portion of said hinge system connects to said bracket system, and said second portion of said hinge system connects to said arm mount;
said hinge system comprises an in-use position and a non-use position;
said hinge system is rotated with said bracket system substantially parallel with said arm mount while in said non-use position;
said hinge system is rotated with said bracket system substantially perpendicular to said arm mount while in said in-use position;
said first bracket comprises a ferromagnetic material;
a first magnet is connected to a side of said arm mount below said hinge system and said first bracket; and
said first magnet is capable of stabilizing said bracket system while in said in-use position.

2. The system of claim 1 wherein said first bracket comprises a first bottom portion and said second bracket comprises a second bottom portion, further wherein said first bottom portion comprises a first aperture, and said second bottom portion comprises a second aperture.

3. The system of claim 2 wherein said first bottom portion comprises bended edges, further wherein said second bottom portion is capable of sliding between said bended edges.

4. The system of claim 2 further comprising
a friction interface between an underside of said first bottom portion and a topside of said second bottom portion, wherein said underside and said topside each comprise rubber.

5. The system of claim 4 wherein said underside and said topside each comprise a rough surface.

6. The system of claim 2 further comprising a camera fastener comprising a camera fastener body and a camera fastener head, wherein said camera fastener body is capable of passing through said first aperture and second aperture, and attaching to a camera fastener receiver of said camera.

7. The system of claim 2 wherein said first bracket further comprises a side portion capable of supporting a first side of said camera.

8. The system of claim 7 wherein said side portion comprises two connected substantially planar walls, one wall substantially parallel with a back of said camera and a second wall substantially parallel with said side of said camera.

9. The system of claim 1, wherein said arm mount comprises a non-use support and an armband.

10. The system of claim 9 wherein said armband comprises a left side comprising a first set of one or more fasteners, and a right side comprising a second set of one or more fasteners, wherein said first set of one or more fasteners is mateable with said second set of one or more fasteners.

11. The arm mount of claim 9 wherein said armband comprises an elastic material.

12. The system of claim 9 wherein said non-use support comprises a substantially flat surface.

13. The system of claim 10 wherein said first one or more fasteners are straps and said second one or more fasteners are buckles.

14. The system of claim 1 wherein said first portion of said hinge system is structurally built into said first bracket, and said second portion of said hinge system is structurally built into said arm mount.

15. The system of claim 1 wherein
said bracket system and said arm mount comprise opposing portions of a latching system having a first portion and a second portion; wherein
said first portion and said second portion of said latching system are aligned and attached to one another when said bracket system is rotated down into said non-use position, and
said first portion and said second portion of said latching system can be released when said bracket system is rotated out of said non-use position.

16. A system for mounting a camera to an arm comprising:
a bracket system capable of supporting a camera;
an arm mount;
a hinge system, having a first portion and a second portion, wherein said hinge system connects said bracket system to said arm mount;
said bracket system comprises a first bracket and a second bracket;
said first portion of said hinge system connects to said bracket system, and said second portion of said hinge system connects to said arm mount;
said hinge system comprises an in-use position and a non-use position;
said hinge system is rotated with said bracket system substantially parallel with said arm mount while in said non-use position;
said hinge system is rotated with said bracket system substantially perpendicular to said arm mount while in said in-use position;
said first bracket comprises a ferromagnetic material;
said bracket system and said arm mount comprise opposing strips of hook-and-loop fasteners having a first portion and a second portion;
said hook-and-loop fasteners are aligned and attached to one another when said bracket system is rotated down into said non-use position; and
said hook-and-loop fasteners release when said bracket system is rotated out of said non-use position.

17. A system for mounting a camera to an arm comprising:
a bracket system capable of supporting a camera;
an arm mount;
a hinge system, having a first portion and a second portion, wherein said hinge system connects said bracket system to said arm mount;
said bracket system comprises a first bracket and a second bracket;
said first portion of said hinge system connects to said bracket system, and said second portion of said hinge system connects to said arm mount;
said hinge system comprises an in-use position and a non-use position;
said hinge system is rotated with said bracket system substantially parallel with said arm mount while in said non-use position;
said hinge system is rotated with said bracket system substantially perpendicular to said arm mount while in said in-use position;
said first bracket comprises a ferromagnetic material;

said bracket system and said arm mount comprise opposing strips of hook-and-loop fasteners having a first portion and a second portion;
said hook-and-loop fasteners are aligned and attached to one another when said bracket system is rotated down into said non-use position; and
said hook-and-loop fasteners release when said bracket system is rotated out of said non-use position.

* * * * *